United States Patent [19]

Sato et al.

[11] Patent Number: 4,545,623
[45] Date of Patent: Oct. 8, 1985

[54] MONITORING CIRCUIT FOR AN ANTILOCK BRAKING SYSTEM THAT DETECTS A SMALLER DIAMETER TIRE

[75] Inventors: Makoto Sato, Kamifukuoka; Yoshikazu Tsuchiya, Fujimi, both of Japan

[73] Assignee: Honda Giken Kogyo Kabushiki Kaisha, Tokyo, Japan

[21] Appl. No.: 509,710

[22] Filed: Jun. 30, 1983

[30] Foreign Application Priority Data

Jul. 2, 1982 [JP] Japan ................. 57-115025

[51] Int. Cl.⁴ .............................. B60T 8/08
[52] U.S. Cl. ................. 303/92; 188/181 C; 340/58
[58] Field of Search ........ 188/181 C, 181 A; 303/92, 94, 95, 96, 97, 98, 99, 110; 180/271; 340/58

[56] References Cited

U.S. PATENT DOCUMENTS

| | | | |
|---|---|---|---|
| 3,691,524 | 9/1972 | Frost et al. | 180/271 |
| 3,740,103 | 6/1973 | Sweet et al. | 303/110 |
| 3,861,760 | 1/1975 | Hamelin | 303/92 |

Primary Examiner—Duane A. Reger
Assistant Examiner—Alvin Oberley
Attorney, Agent, or Firm—Armstrong, Nikaido, Marmelstein & Kubovcik

[57] ABSTRACT

An antilock braking apparatus is disclosed which is constructed so as to operate by way of the steps of detecting wheel speed signals from each of wheels and thereafter releasing antilock control in dependence on a value of difference in the level of wheel speed signals arbitrarily selected. The apparatus makes it possible to detect the existence of a tire having a smaller diameter such as provisional tire or the like if any and moreover to inhibit an occurrance of malfunction of the apparatus due to the existence of such a smaller diameter tire while maintaining required braking force.

7 Claims, 2 Drawing Figures

MONITORING CIRCUIT FOR AN ANTILOCK BRAKING SYSTEM THAT DETECTS A SMALLER DIAMETER TIRE

BACKGROUND OF THE INVENTION

1. Field of the Invention

The present invention relates to an antilock braking apparatus and more particularly to an antilock braking apparatus adapted to operate by way of the steps of making a decision as to whether or not a tire having a smaller effective radius such as provisional tire or the like is mounted on a vehicle on the basis of difference in angular speed between arbitrarily selected wheels and then generating a release signal for releasing antilock control immediately after it is found that a tire having a smaller effective radius such as provisional tire or the like is mounted thereon, whereby a responsive function of the antilock braking apparatus is assured with respect to the existence of such a tire as having a smaller effective radius.

2. Description of the Prior Art

As is generally known, a rate of difference in speed between vehicle speed and peripheral speed of wheels to the vehicle speed, that is, a wheel slip rate tends to increase as a braking force increases during braking operation. A conventional antilock braking apparatus is usually constructed so as to inhibit application of braking force to wheels when a wheel locking is about to occur due to excessive braking force and then release inhibition of braking force when the wheels again resume the original peripheral speed and a fear disappears of causing wheel locking, wherein the aforesaid wheel slip rate functions is an essential input factor for controlling braking force. However, to allow a wheel slip rate to be effectively utilized for control operation, peripheral speed of the wheels and vehicle speed should be first detected.

In the case of standard tires being mounted on the vehicle, their effective radius has been previously known so that the peripheral speed of a wheel can be readily calculated from the number of revolutions or angular speed of the wheel if it is known. A wheel speed detector employed for the antilock braking apparatus is usually designed so as to detect angular speed of a wheel and thereafter generate signals as a wheel speed signal having a frequency in proportion to that angular speed. It is natural that a frequency of wheel speed signal is in proportion to peripheral speed of the wheel.

To provide means for detecting vehicle speed there has been already proposed various methods in which it is directly or indirectly detected. In the conventional antilock control apparatus a method of estimating vehicle speed from peripheral speed of a wheel is usually employed mainly for the economical and technical reasons.

In this method calculation of peripheral speed of a wheel is carried out by detecting angular speed of the same and vehicle speed is then estimated from the thus calculated peripheral speed on the assumption that standard tires are mounted on a vehicle. If a so-called provisional tire having a smaller effective radius than that of standard tires is fitted onto a wheel, it results that peripheral speed of the wheel is estimated higher than its actual one and thereby vehicle speed which is usually estimated by utilizing peripheral speed of the wheel as an input information is likely to be estimated excessively high.

Once vehicle speed is estimated higher than its actual one in the antilock braking apparatus, a wheel slip rate of a wheel with a standard tire mounted thereon which is calculated from the estimated vehicle speed is determined higher than its actual one. As a result braking force is excessively suppressed to cause a substantial reduction of the braking effect.

A so-called provisional tire is normally equipped on a vehicle in view of an occurance of puncture in any one of the standard tires and therefore a plurality of provisional tires are very rarely used on a plurality of wheels simultaneously.

SUMMARY OF THE INVENTION

The present invention has been proposed in view of the above and its object resides in providing an improved antilock braking apparatus which is constructed so as to detect that a tire having a smaller diameter such as a provisional tire or the like is mounted on any one of wheels on a vehicle and thereby to prevent an occurance of malfunction due to the existence of such a smaller diameter tire.

To accomplish the above object, there is proposed according to the present invention an antilock braking apparatus essentially comprising a wheel speed signal generating device adapted to generate wheel speed signals each having a level proportional to an angular speed of each of wheels, a wheel speed difference signal generating device adapted to generate wheel speed difference signals each of which indicates a value of difference in the level of said wheel speed signals derived from arbitrarily selected two wheels and a release signal generating device adapted to generate release signals for releasing antilock control in dependence on the level of the wheel speed difference signal.

Further, there is proposed according to another aspect of the present invention an antilock braking apparatus essentially comprising a wheel speed signal generating device adapted to generate wheel speed signals each having a level proportional to an angular speed of each of wheels, a wheel speed difference signal generating device adapted to generate wheel speed difference signals each of which indicates a value of difference in the level of the wheel speed signals derived from each pair of the wheels arbitrarily selected to form two pairs and a release signal generating device adapted to generate release signals for releasing antilock control when only one of the wheel speed difference signals exceeds a predetermined level.

Since an antilock braking apparatus of the invention is constructed so as to make a decision as to whether or not a tire having a smaller diameter such as provisional tire or the like is mounted on a vehicle on the basis of a difference in the level of wheel speed signals, it is possible to assuredly detect the existence of a tire having a smaller diameter without any necessity for provision of a specially designed device for detecting straight running of a vehicle and moreover without any fear of making an incorrect decision during turning movement of the vehicle. In addition an occurance of malfunction of the antilock braking apparatus due to the existence of a tire having a smaller diameter is reliably prevented while required braking force is maintained.

The above and other objects, features and advantages of the invention will become more clearly apparent from the reading of the following description made in conjunction with the accompanying drawings.

BRIEF DESCRIPTION OF THE DRAWINGS

The accompanying drawings will be briefly described below.

DETAILED DESCRIPTION OF THE PREFERRED EMBODIMENT

Now, the present invention will be described in greater detail hereunder with reference to the accompanying drawings which schematically illustrate a preferred embodiment.

Figure 1:
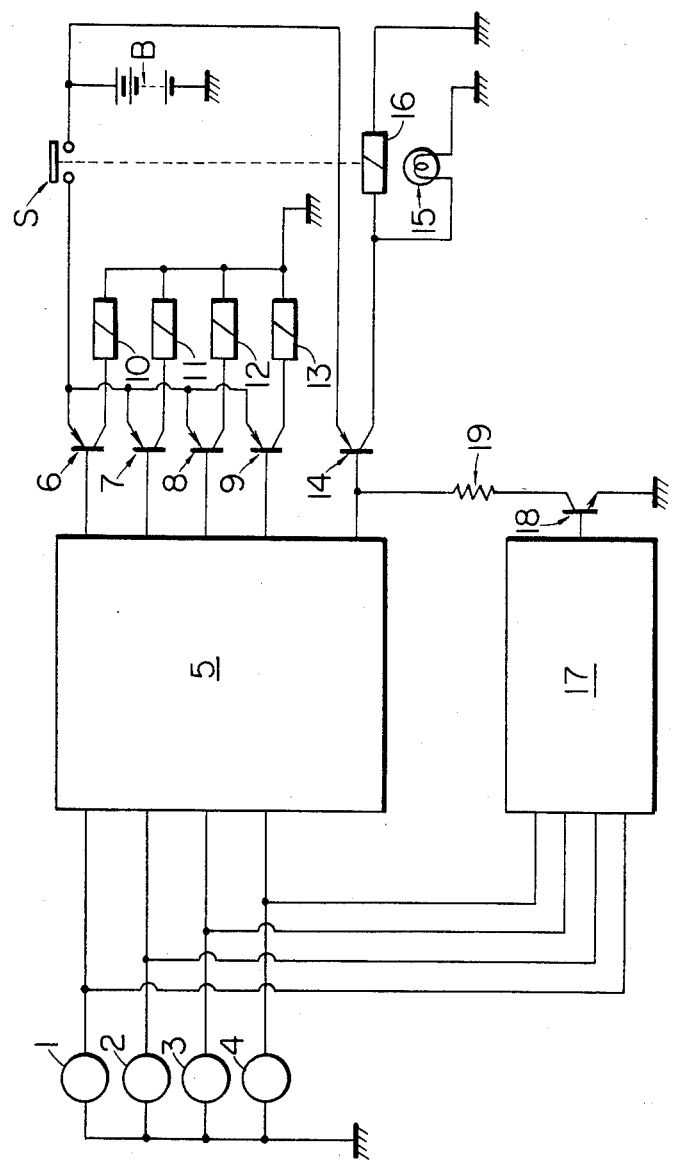
FIG. 1 is a system diagram schematically illustrating an antilock braking apparatus in accordance with an embodiment of the invention.

Referring first to FIG. 1, a righthand front wheel speed detector 1, a lefthand front wheel speed detector 2, a righthand rear wheel speed detector 3 and a lefthand rear wheel speed detector 4 constitute in combination a wheel signal generating device which serves to generate a series of pulses as peripheral speeds of wheels, said pulses having a frequency in proportion to angular speed of a related wheel respectively. Thus, generated wheel speed signals are transmitted to an anti-lock control circuit 5.

After completion of processing and decision on the basis of wheel speed signals delivered from the wheel speed detectors 1, 2, 3 and 4, the antilock control circuit 5 selectively transmits a signal to each of a power transistor 6 adapted to actuate a front wheel pressure introducing actuator 10 which serves to introduce control pressure for inhibiting braking force for both left and right front wheels, a power transistor 7 adapted to actuate a front wheel pressure discharging actuator 11 which serves to discharge said control pressure for the front wheels, a power transistor 8 adapted to actuate a rear wheel pressure introducing actuator 12 which serves to introduce control pressure for inhibiting braking force for both left and right rear wheels, and a power transistor 9 adapted to actuate a rear wheel pressure discharging actuator 13 which serves to discharge said control pressure for the rear wheels.

Further, the antilock control circuit 5 includes a malfunction diagnostic circuit for diagnosing an occurance of trouble in the antilock control system and when it is found that a trouble occurs in the antilock control system, a signal is transmitted to a power transistor 14 which is connected to a power supply B. As soon as the power transistor 14 receives a signal from the antilock control circuit 5, an alarm 15 such as alarm lamp, alarm buzzer or the like is turned on immediately and at the same time a switch actuator 16 is turned on to disconnect a normally closed switch S which normally connects each of the power transistors 6, 7, 8 and 9 to the power supply B. The above description has been made with respect to a typical example of hitherto known antilock braking apparatuses.

Incidentally, wheel speed signals generated by each of the wheel speed detectors 1, 2, 3 and 4 are transmitted also to a smaller diameter tire detector 17. Specifically, the smaller diameter tire detector 17 includes a wheel speed difference signal generating device adapted to generate wheel speed difference signals each of which is indicative of a value of difference in the level of wheel speed signals issued, for instance, from each of two pairs of wheels and a release signal generating device adapted to generate a release signal which is effective in releasing antilock control when one of the wheel speed difference signals has a level lower than a predetermined level and the other wheel speed difference signal is at a level higher than another predetermined level which is not lower than the first mentioned predetermined level.

A release signal generated in the release signal generating device is transmitted to a transistor 18 as an output signal from the smaller diameter tire detector 17, said transistor 18 being in connection to the power transistor 14 via a resistor 19. Thus, as the release signal generating device in the smaller diameter tire detector 17 generates a release signal, the power transistor 14 is caused to operate so that the alarm 15 generates an alarm and at the same time the normally closed switch S is disconnected. As a result a braking apparatus is shifted to the operational condition where it has no antilock control function whereby required braking force is assured.

Next, description will be made below with respect to a detecting method employable when a tire having a smaller effective diameter such as a provisional tire or the like is mounted.

The wheel speed detectors 1 and 2 for the left and right front wheels as well as the wheel speed detectors 3 and 4 for the left and right rear wheels are designed to generate pulse signals each having a frequency in proportion to angular speed of the related wheel. In general they are constructed to generate a certain number of pulses N per one revolution of wheel.

Assuming that one of the left and right front wheels includes a tire having an effective diameter D and the other wheel incudes a tire having an effective diameter smaller than D by the factor of 100r % of D, i.e., rD, the latter has an effective diameter of D - rD. Thus, when counting of the number of output pulses from both the left and right wheels is started simultaneously, the number of output pulses that result from the tire having an effective diameter D - rD reaches the predetermined reference number of output pulses $n_o$ faster than that of the other tire. At this moment the number of output pulses from the other tire is naturally smaller than the reference number of pulses $n_o$ and provided that the number is represented by $n_o - \Delta_n$, the following equation will be established:

$$\pi(D - rD)\frac{n_o}{N} = \pi D \frac{n_o - \Delta_n}{N}$$

When the above equation is rearranged in a shorter form, simplified equation $\Delta_n = rn_o$ is obtained. This means that $\Delta_n$ is equal to a value of product of rate of difference r between effective diameters of left and right wheels multiplied by the reference number of pulses $n_o$. If it is found that $\Delta_n$ is larger than the predetermined reference value, it can be decided that a tire having a smaller diameter is mounted.

It should be noted that the above-defined equation can be established only when a vehicle runs in the substantially straight direction. During turning movement of a vehicle, however, there is fear of making an incorrect decision that a tire having a smaller diameter is mounted thereon in spite of the fact that all tires mounted thereon have the same effective diameter, because tires located outside during turning movement of the vehicle have an angular speed larger than those located inside. Accordingly, it should be decided that a tire having a smaller diameter is mounted on a vehicle, when it is found that $\Delta_n$ exceeds the reference value while the vehicle is running in the substantially straight direction.

To detect whether a vehicle is running straightly there have been already made various proposals. The conventional detecting methods are typically carried out by measuring steering angle, actual inclination angle of wheels with respect to the longitudinal axis of the vehicle body, acceleration in the transverse direction relative to a vehicle, yaw angular speed of the same or the like but a problem stays in that any of the conventional methods required a specially designed detecting device to be additionally equipped on a vehicle.

In view of the above-mentioned background there have been raised many requests for an useful detecting method which can make a correct decision as to whether a tire having a smaller diameter is mounted on a vehicle or not by utilizing only a wheel speed sensor usually incorporated in an antilock braking apparatus without any necessity for a specially designed detecting device and moreover without fear of making any erroneous decision during turning movement of the vehicle.

In general, a tire having a smaller diameter such as provisional tire or the like is carried on a vehicle, taking into account such an accident that a puncture may take place with one of the standard tires mounted thereon. It is rarely that a plurality of tires having a smaller diameter are simultaneously used in a vehicle. Thus, it can be considered that at least one pair of respective paired front and rear wheels are fitted with standard tires on both the left and right sides.

Accordingly, it can be decided that a tire having a smaller diameter is mounted on a vehicle when it is found that a detected difference $\Delta_{nf}$ in the number of output pulses from both the lefthand and righthand front wheels and another detected difference $\Delta_{nr}$ in the number of output pulses from both the lefthand and righthand rear wheels is smaller than the predetermined reference value $E_1$ and the other one is larger than the predetermined reference value $E_2 (\geq E_1)$ with the vehicle traveling straightly.

As an exemplified case, a tire smaller than standard tires in its effective diameter by 15% was mounted on a vehicle with a detecting system having the number of output pulses N=100 employed therefor, and good results were obtained with reference number of pulses $n_o=256$, reference value $E_1=8$ and reference value $E_2=30$.

Figure 2:
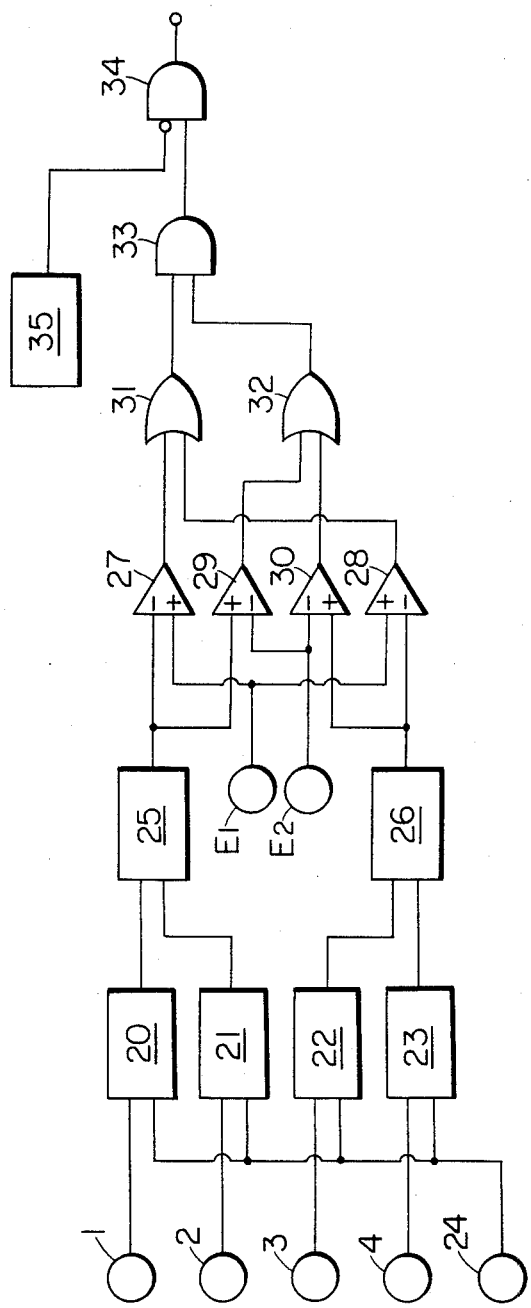
FIG. 2 is a circuit diagram illustrating an essential part of a smaller tire detector included in the antilock braking apparatus of FIG. 1.

FIG. 2 schematically illustrates an embodiment of a typical device for detecting a tire having a smaller diameter by way of a circuit diagram. In the drawing reference numerals 1 and 2 designate wheel speed detectors for left and right front wheels, respectively, reference numerals 3 and 4 designate wheel speed detectors for left and right rear wheels, respectively, reference numerals 20, 21, 22 and 23 designate counter circuits, respectively, reference numeral 24 designates a trigger signal generating circuit for the counter circuits 20, 21, 22 and 23, reference numerals 25 and 26 designate subtraction circuits, respectively, reference numerals 27, 28, 29 and 30 designate comparison circuits, respectively, reference numerals 31 and 32 designate OR circuits, respectively, and reference numeral 33 designates an AND circuit.

When the counter circuits 20, 21, 22 and 23 receive signals from the trigger signal generating circuit 24, they start to count the number of output pulses from the corresponding wheel speed detectors 1, 2, 3 and 4. The counter circuits 20 and 21 output the number of output pulses $n_o$ and $n_f$ from the wheel speed detectors 1 and 2 when the number of counts obtained by either of the counter circuits 20 and 21 reaches the value of $n_o$; at the same time the counter circuits 22 and 23 output the number of output pulses $n_o$ and $n_r$ from the wheel speed detectors 3 and 4 when the number of counts obtained by either of the counter circuits 22 and 23 reaches the value of $n_o$. Their outputs are then input to the corresponding subtraction circuits 25 and 26. Then, the subtraction circuits 25 and 26 process the simplified equations $n_o - nf = \Delta nf$ and $n_o - nr = \Delta nr$ so that the difference signal $\Delta_{nf}$, thus obtained is input to the comparison circuits an 27 and 29 and the difference signal $\Delta_{nr}$ is input to the comparison circuits 28 and 30.

Specifically, the comparison circuits 27 and 28 are designed to compare the predetermined reference value $E_1$ with the values of difference signals $\Delta_{nf}$ and $\Delta_{nr}$. The comparison circuit 27 generates its output as long as inequality $\Delta_{nf} < E_1$ is established and the comparison circuit 28 generates its output as long as an inequality $\Delta_{nr} < E_1$ is established. Their outputs are then input to the OR circuit 31. Further, the comparison circuits 29 and 30 are designed to compare the predetermined reference value $E_2 (\geq E_1)$ with the values of difference signals $\Delta_{nf}$ and $\Delta_{nr}$. The comparison circuit 29 generates its output as long as an inequality $\Delta_{nf} > E_2$ is established and the comparison circuit 30 generates its output as long as an inequality $\Delta_{nr} > E_2$ is establshed, which outputs are thereafter input to the OR circuit 32.

Outputs of the OR circuits 31 and 32 are fed to the AND circuit 33.

Thus, since the AND circuit 33 generates its output only when either of the values of difference signals $\Delta_{nf}$ and $\Delta_{nr}$ is smaller than the reference value $E_1$ and the other one is larger than the reference value $E_2$, output of the AND circuit 33 at this moment reveals that a tire having a smaller diameter is mounted on a vehicle.

In the above-described embodiment of the invention reference numerals 1 and 2 designate left and right front wheel speed detectors and reference numerals 3 and 4 designate left and right rear wheel speed detectors but reference numerals 1 and 2 may designate left front and rear wheel speed detectors and reference numerals 3 and 4 may designate right front and rear wheel speed detectors, because in an embodiment thus constructed the same results are obtainable as in the foregoing one.

Further, it should be noted that the practicably same results can be obtained as in the illustrated embodiment, even in a case where values of difference signals $\Delta_{nf}$ and $\Delta_{nr}$ are calculated by detecting the number of output pulses from the wheel speed detectors obtained when the number of output pulses from any one of the wheel speed detectors 1, 2, 3 and 4 reaches the number of reference pulses $n_o$.

It should be further noted that the above-mentioned detecting should be carried out only when the braking apparatus is kept inoperative, because wheel speed fluctuates at random during braking operation, particularly during abrupt braking operation. In view of an occurance of the foregoing case an arrangement may be made such that reverse signals derived from signals generated by the braking signal generator 35 as well as output signals from the AND circuit 33 are transmitted to the AND circuit 34.

Further, in an antilock braking apparatus of the invention, comparison signals for making a comparison with the predetermined value $E_1$ are not always required and they may be neglected if sufficiently high accuracy is obtainable without them.

While the invention has been described above with respect to a preferred embodiment thereof, it should be of course understood that the invention is not limited only to this but various changes or modifications may be made in a suitable manner without any departure from the spirit and scope of the invention.

What is claimed is:

1. An antilock braking apparatus for a wheeled vehicle having braking means including antilock control means, comprising:
    a plurality of wheel speed signal generating means adapted to generate wheel speed signals proportional to angular speed of each of a plurality of wheels of said vehicle;
    small-diameter tire detecting means comprising a wheel speed difference signal generating means adapted to generate wheel speed difference signals each of which indicates a value of difference in the level of said wheel speed signals derived from each pair of two pairs of said wheels arbitrarily selected;
    said small-diameter tire detecting means further comprising means for determining from said difference signals when one of said wheels has a diameter different from the diameters of the other of said wheels and means for generating a release signal in response to such a determination; and
    means responsive to said small-diameter tire detector release signal for releasing said antilock control means, whereby said antilock control means will be inoperative when said vehicle has one smaller diameter tire.

2. An antilock braking apparatus as defined in claim 1 wherein said release signal is generated when the level of only one of said wheel speed diference signals exceeds a predetermined level.

3. An antilock braking apparatus as defined in claim 2 further comprising means for permitting generation of a release signal only when said braking means is inoperative.

4. An antilock braking apparatus as defined in claim 1 wherein one of said pairs of wheels consists of left front and right front wheels and said other pair consists of left rear and right rear wheels.

5. An antilock braking apparatus as defined in claim 1 wherein one of said pairs of wheels consists of left front and left rear wheels and said other pair consists of right front and right rear wheels.

6. An antilock braking apparatus as defined in claim 1 wherein said means for determining when one wheel has a diameter different from the others comprises first comparator means for comparing the levels of said wheel speed difference signals with a reference value of a first predetermined level, second compartor means for comparing the levels of said wheel speed difference signals with a reference value of a second predetermined level that is not higher than said first predetermined level, and said means for generating a release signals is responsive to the outputs of said comparator means and operates only when the level of one of said wheel speed difference signals exceeds said first predetermined level and the level of the other of said wheel difference signals is below said second predetermined level.

7. An antilock braking apparatus as defined in claim 6 further comprising means for preventing applcation of said release signal to said antilock control means when said braking means is operated.

* * * * *